Jan. 9, 1968  B. J. VEILLEUX  3,363,074
HYDRAULIC BRAKE SYSTEM PRESSURE SENSING DEVICE
Filed Sept. 9, 1966
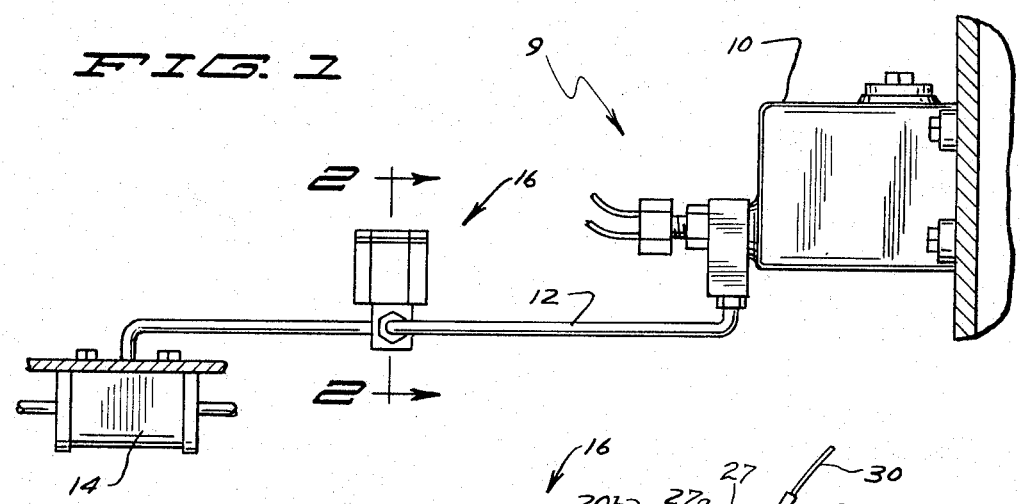
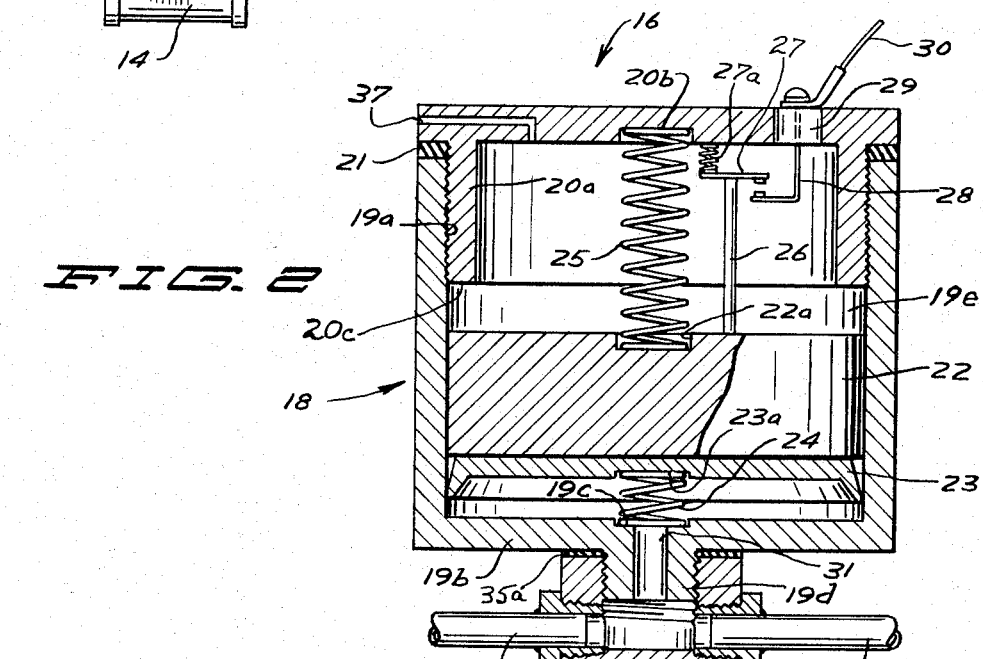
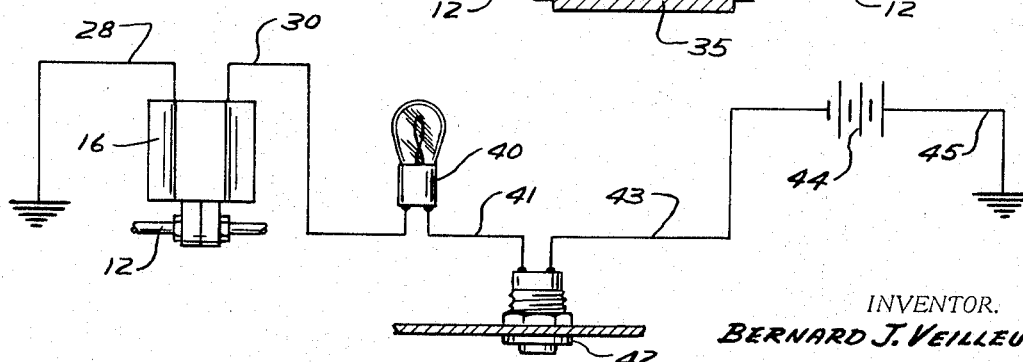
INVENTOR.
BERNARD J. VEILLEUX
BY
Reiland Gregory
ATTORNEYS United States Patent Office 3,363,074
Patented Jan. 9, 1968

3,363,074
HYDRAULIC BRAKE SYSTEM PRESSURE SENSING DEVICE
Bernard J. Veilleux, 6608 Penn Ave. S., Minneapolis, Minn. 55423
Filed Sept. 9, 1966, Ser. No. 578,327
1 Claim. (Cl. 200—82)

ABSTRACT OF THE DISCLOSURE

A hydraulic brake system pressure sensing device consisting of a housing having a single chamber therein, a floating piston within said chamber, a spring disposed within said chamber holding said piston in a non-operating position exerting sufficient pressure thereagainst to offset the opposing residual pressure of the brake system, an electrical contact carried by said piston adapted to engage a second contact within said chamber upon a downward movement of said piston responsive to a lessening of the residual pressure of said brake system whereby said contacts engage and energize a signal in circuit therewith.

---

The invention herein relates to a device for sensing and indicating a leakage of fluid in connection with a hydraulic braking system.

More specifically the invention herein relates to a device particularly arranged and constructed to sense and indicate a reduction below a predetermined level in the residual pressure in a hydraulic braking system as for an automotive vehicle.

It is desirable to have means for determining leakage in a hydraulic braking system prior to the application of the brakes to determine the condition of the system. A certain residual pressure is normally maintained in the system and the presence of said pressure indicates that the braking system with reference to fluid pressure is in good working order. A reduction in the residual pressure will be indicated by a signal and this indicates a leakage of fluid from the system.

It is an object of this invention to provide a simply constructed and simply installed device to indicate any loss or reduction of residual pressure of a hydraulic braking system with respect to an automotive vehicle.

It is another object of this invention to provide a relatively small substantially self-contained cartridge type of device for indicating a reduction of residual pressure in a hydraulic braking system.

It is more specifically an object of this invention to provide a small self-contained device comprising a switch in circuit with a signal and means actuating said switch, said means being responsive to a reduction of residual pressure of a hydraulic braking system.

These and other objects and advantages of the invention will be set forth in the following description made in connection with the accompanying drawings in which like reference characters refer to similar parts throughout the several views and in which:

FIG. 1 is a broken layout view partially in section showing the invention herein in an operating position;

FIG. 2 is a magnified view in section of the device herein taken on line 2—2 of FIG. 1 as indicated; and FIG. 3 is a wiring diagram.

With reference to the drawings, the device which is the subject matter of the invention herein is indicated generally by the character 16. In FIG. 1, said device is shown placed in an operating position installed in a conventional hydraulic braking system 9 of an automotive vehicle and being installed into a line 12 running from the master cylinder 10 of the system to a wheel cylinder 14. Each of the wheels of the vehicle will have a like cylinder. It will be understood that the entire system is a unitary system, as will hereinafter be further described.

Referring now to FIG. 2, the device 16 comprises an exteriorly non-round housing 18 such as having its side walls octagonal in form. The housing for the purposes herein is relatively small and may be on the order of one and one-half inches in length by one inch in width. Said housing comprises side walls 19, an upper interiorly threaded portion 19a, a lower end wall 19b and a threaded boss 19d projecting outwardly centrally of said end wall. Said end wall has a central interior recess 19c.

The upper end portion of said housing comprises an end wall 20 shown here in the form of a cap having an inset depending annular externally threaded flange portion 20a to be received into said threaded portion 19a with the bottom wall of said flange portion forming a stop member 20c. Centrally interiorly of the upper wall of said cap is a circular recess 20b.

Disposed between said cap 20 and the upper end of said threaded portion 19a is an annular or ring-like seal 21.

Within said housing 18 is a chamber 19e substantially cylindrical in form. Disposed within said chamber is a free floating wafer-like piston 22 having a central circular recess 22a in its upper wall in alignment with said recess 20b. Disposed between said piston 22 and said cap 20 is a tension coiled spring 25 having its end portions respectively seated within said recesses 20b and 22a.

Underlying said piston and operative therewith is a conventional type of resilient seal 23 urged here into engagement with said piston by a coil spring 24 having one end seated within the recess 19c and its other end within the aligned recess 23a formed within the undersurface of said seal. Said spring will be a relatively weak spring having just sufficient tension to make certain that said seal 23 will have constant engagement with said piston.

Upstanding from said piston in an off-center position is a supporting member 26 shown as a post or rod carrying at its upper end an electrical contact 27 being grounded to said cap 20 by a coiled resilient wire 27a. Inserted into said cap 20 is an insulating plug 29 having an electrical contact 28 depending therethrough. Said contact 28 has a lower angled portion as shown, to underlie said contact 27 spaced thereabove for engagement therewith. Running from said electrical contact 28 is a line 30.

Extending axially through said boss 19d is an inlet or passage 31 for communication with said chamber 19e.

Formed through said cap 20 is an air vent 37.

The device 16 as above described is a self-contained cartridge which will be installed into the line 12 by a conventional T fitting or connecting member 35 which will have said boss 19d threaded thereinto. The line 12 will be severed with the respective separated ends being secured into the respective lateral openings of said T member. An annular seal or washer 35a is shown in connection with said T member.

Referring to FIG. 3, a simple signal electrical circuit is shown by means of which the signal 40 is energized or actuated by the device 16. The line 27a grounds the circuit to the cap 20 and the device 16 is grounded to the vehicle chassis in its installed position. The line 30 runs to what is shown here as a visual signal member 40 which in turn has a line 41 running to the ignition switch 42 which in turn will be connected to the battery 44 as by a line 43, and said battery will be grounded as by a line 45.

*Operation*

In the hydraulic braking system of an average type of automotive vehicle for personal use there is a residual pressure on the order of 8 to 10 lbs. This residual pressure is the pressure present in the system when the brake pedal is not depressed.

There is free communication between the master cylinder 10 and the individual wheel cylinders 14. A reduction in the residual pressure will indicate a leakage of fluid from the system. The purpose of the device here is to indicate the leakage before it has become so serious that there is inadequate pressure to operate the brake shoes. The piston 22 will be held in a balanced position by the spring 25 at one side thereof with said spring having just sufficient pressure to offset the residual pressure of the hydraulic fluid through the inlet 31 bearing against said piston. The piston has but a small travel distance as from $3/16$ to $1/4$ inch from the seal 23 to the end wall 19b. The electrical contacts 27 and 28 are spaced apart a lesser distance than said travel distance of said piston. When there is a sufficient reduction in residual pressure for said piston to move the distance to said end wall 19b, then engagement between said electrical contacts will close the signal circuit. When the ignition switch of the vehicle is turned to "on" position, the signal circuit will be energized and the signal 40 will be lighted.

Any reduction in the residual pressure which is too slight to permit the travel of the piston a sufficient distance to cause the engagement of the electrical contacts may be disregarded. The travel distance will allow for expansion and contraction of the hydraulic fluid without affecting the signal 40.

It will be understood that the device herein is intended to operate as a warning to notify the driver of a reduction in residual pressure as the vehicle is being started and prior to its use. The warning herein is given while there is still sufficient pressure in the braking system to operate the brake shoes permitting for timely remedial action to be taken.

It will be understood that the device herein operates with respect to the residual pressure in the hydraulic system and not with respect to imposed pressure on the system such as with the brake pedal being depressed. Upon the turning of the ignition switch to "on" position, the device is energized for operation. The shoulder or stop member 20c limits the upward travel of the piston when the pressure in the system is increased by the use of the brakes of the vehicle.

The device herein is readily installed. A conventional T member is inserted into a brake line and will have a female threaded opening to receive the boss 19d. The housing 18 has a non-round exterior to permit the use of a wrench thereon.

Thus it is seen that I have provided a compact readily installed sensing device which has proved to be very successful as a safety device in sending and indicating a reduction in the residual pressure of a hydraulic braking system.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claim.

What is claimed is:

1. A brake system hydraulic pressure sensing and indicating device in connection with a brake line having a normally predetermined degree of residual pressure therein having in combination, a unitary housing having a single chamber therein, a cylindrical wafer-like piston completely disposed and retained within said chamber, a floating seal underlying said piston, an inlet through said housing into said chamber at the lower side of said piston, means connecting said inlet to said brake line, an electrical contact depending from an upper portion of said chamber above the upper side of said piston, a post upstanding from said piston, an electrical contact carried by said post in alignment with and spaced above said first mentioned contact, a spring disposed between and engaging the upper wall of said chamber and the upper side of said piston, a second spring disposed between and engaging the lower side of said floating seal and the bottom wall of said chamber, said second spring exerting just sufficient pressure to maintain said seal in contact with said piston, said first mentioned spring being arranged and constructed to exert just sufficient pressure against said piston to offset the opposing residual pressure of fluid from said brake line present in said chamber bearing against the lower wall of said seal, whereby when said residual pressure is reduced, said piston will be urged downwardly within said chamber and said second mentioned contact will engage said first mentioned contact to close a circuit, and signal means in circuit with said contacts energized thereby.

References Cited

UNITED STATES PATENTS

| | | | |
|---|---|---|---|
| 1,475,697 | 11/1923 | Hartman | 200—82 |
| 2,535,940 | 12/1950 | Malvin | 200—82 |
| 2,734,960 | 2/1956 | Reynolds | 200—82 |
| 3,228,194 | 1/1966 | Blair | 303—84 |

BERNARD A. GILHEANY, *Primary Examiner.*

H. BROOME, *Assistant Examiner.*